Feb. 2, 1960 H. F. McKENNEY 2,923,877
FEEDBACK WITH HALF WAVE CIRCUIT
Filed Dec. 17, 1956
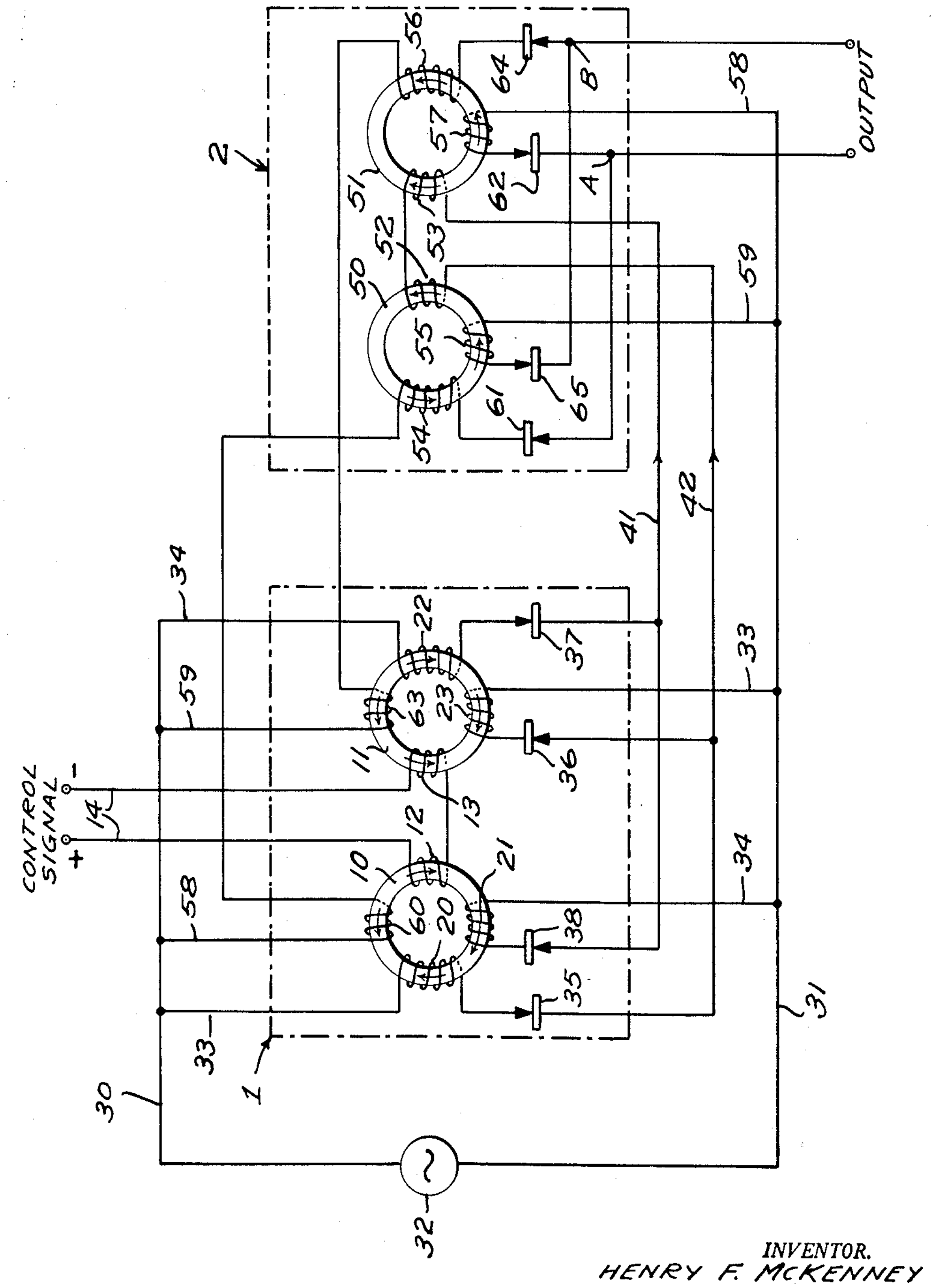
INVENTOR.
HENRY F. McKENNEY
BY Victor D. Borst
ATTORNEY 2,923,877

FEEDBACK WITH HALF WAVE CIRCUIT

Henry F. McKenney, Weston, Mass., assignor to Sperry Rand Corporation, Ford Instrument Company Division, Long Island City, N.Y., a corporation of Delaware Application December 17, 1956, Serial No. 628,611

4 Claims. (Cl. 323—89)

This invention relates to magnetic amplifier systems and more particularly improved bias and signal feedback means for bridge type half-wave magnetic amplifiers.

The conventional half-wave bridge type magnetic amplifier is characterized by a bridge network for each stage comprising two reactors connected in branch circuits across an A.C. line, the branch circuits having similarly poled half-wave rectifiers so that they are both pulsed by the same half-wave of the line voltage. Each reactor winding has in series with it an impedance serving as a voltage divider which optionally may be a winding disposed on the other magnetic core of said stage. The control current which governs the saturation of the reactor magnetic circuits of the first stage acts differentially or in a push-pull relation with respect to the reactor windings to effect a differential flux preconditioning of the two magnetic paths on the off-half-cycle of the reactor windings. Each control winding after the first stage is connected for energization across the branch circuits between the reactor winding and the impedance of the respective branch circuit.

The bridge network incorporated in each stage of the amplifier produces an output when the bridge is unbalanced. Some biasing means is normally desirable to establish the operating conditions for maximum performance of the amplifier. Furthermore, without adequate biasing on each flux setting off-cycle, a weak signal, and especially no signal, can allow the normally small instabilities in any magnetic circuit to slightly unbalance the bridge in an irregular manner and thereby introduce false output responses relative to the input. Conventional biasing means include a resistor shunting each half-wave rectifier or a separate bias winding disposed upon each magnetic circuit in series with a half-wave rectifier, the winding and the rectifier being connected across the line. A principle object of this invention is to provide an improved circuit means for incorporating bias and signal feedback features in half-wave bridge type amplifiers.

The invention is particularly embodied in a two-stage-half-wave bridge type magnetic amplifier and resides in the utilization of only one additional winding disposed on each magnetic circuit of the first stage in a feedback-bias circuit for coupling the bridge network of the second stage with the bridge network of the first stage. The additional winding is connected so as to effect combination bias and signal feedback characteristics. In the present state of the bridge type magnetic amplifier art, one winding and one half-wave rectifier is normally employed for biasing means alone. To incorporate an additional characteristic of signal feedback, at least another winding requirement is normally indicated.

As presently contemplated in this invention, there is provided a feedback-bias winding disposed on each of the two magnetic circuits of the first amplifier stage, each feedback-bias winding being connected in series in one of the two branch circuits of the second amplifier stage. With zero signal in the first stage control circuit, the magnetic circuits are adjusted so that saturation of the two cores in the first stage occurs at the 90° firing angle of its on-half-cycle and the saturation of the two cores in the second stage occurs at the 90° firing angle of its on-half-cycle, the latter being phase displaced from the former by 180°. By providing the feedback-bias circuit, the second stage bridge network currents can bias the magnetic circuits of the first stage to a constant and selected quiescent flux level during each off-half-cycle of the first stage.

A signal impressed upon the control circuit of the first amplifier stage will differentially preset the flux level from the quiescent level in its off-half-cycle and unbalance the bridge networks to produce an output current. Moreover, the branch currents in the last bridge network will also be unbalanced and a signal feedback to the control circuit will be accomplished even though the feedback circuit is not directly connected in the load circuit.

The features of the invention will be understood more clearly from the following detailed description taken in conjunction with the accompanying drawing, in which The drawing is a schematic representation of a two stage, half-wave, bridge type, magnetic amplifier incorporating combination biasing and negative signal feedback windings in associated circuits.

Referring to the drawing, there is provided two saturable reactor bridge networks 1 and 2 for the schematically disclosed two stage amplifier. Bridge network 1 includes two closed saturable magnetic ring cores 10 and 11 on which there are disposed control windings 12 and 13, respectively. A control circuit 14 includes in series opposition the windings 12 and 13. Disposed on the ring cores 10 and 11 are reactor windings 20 and 21 and reactor windings 22 and 23, respectively. Connected to A.C. lines 30 and 31 which are energized by an alternating supply generator 32 are two branch circuits 33 and 34 for bridge network 1. Branch circuit 33 comprises a series circuit of the winding 20, a half-wave rectifier 35, a half-wave rectifier 36, both rectifiers being poled away from the conductor 30, and the winding 23. Branch circuit 34 comprises a series circuit of the winding 22, a half-wave rectifier 37, a half-wave rectifier 38, both rectifiers being poled away from the conductor 30, and the winding 21. The output of the first amplifier stage appears between conductors 41 and 42 which are connected to the junction points between the unidirectional devices in the branches 33 and 34, respectively.

Bridge network 2 includes two closed saturable magnetic ring cores 50 and 51 on which are disposed control windings 52 and 53. An input circuit to the bridge network 2 comprises in series opposition the windings 52 and 53 and the conductors 41 and 42. Disposed on the ring cores 50 and 51 are reactor windings 54 and 55 and reactor windings 56 and 57, respectively. For the bridge network 2 two branch circuits 58 and 59 are connected across the A.C. lines 30 and 31. Branch circuit 58 comprises a series circuit of a feedback-bias winding 60 disposed on the core 10 of bridge network 1, the winding 54, a half-wave rectifier 61, a half-wave rectifier 62, both devices being poled toward the conductor 30, and the winding 57. Branch circuit 59 comprises a series circuit of a feedback-bias winding 63 disposed on the core 11 of bridge network 1, the winding 56, a half-wave rectifier 64, a half-wave rectifier 65, both devices being poled toward the conductor 30, and the winding 55.

A half-wave reversible output for the two-stage amplifier appears across the junction point A and B of the unidirectional devices in the branches 58 and 59, respectively.

The two reactor windings on each of the cores 10, 11, 50 and 51, are wound and sensed to induce similarly directed fluxes in their individually associated cores.

For combination biasing and negative signal feedback, the feedback-bias windings 60 and 63 are wound and sensed so that the unidirectional currents in the branches 58 and 59 will induce fluxes in the cores 10 and 11, respectively, in opposition to the fluxes induced in these cores by the reactor windings.

The component values of the magnetic circuits are selected and adjusted so that the cores will saturate at the 90° firing angle of its on half-cycle when the signal applied to the control circuit 14 is zero. With the simultaneous saturation of the cores 10 and 11, no output signal will appear across the conductors 41 and 42 of the balanced bridge network 1. With the simultaneous saturation of the cores 50 and 51 occurring later or earlier by 180°, the output across the balanced bridge 2 at points A and B will be zero. However, the simultaneous currents in the branches 58 and 59 which include the feedback-bias windings 60 and 63, respectively, will flow for 90° of its one-half-cycle. With proper feedback-bias winding design, these currents will bias the cores 10 and 11, which are at that time on their off-half-cycle, to a proper quiescent flux level so as to maintain a 90° firing angle in both cores. A signal impressed upon the control circuit 14, will differentially preset the flux level in the cores 10 and 11 on the off-half-cycle so that one of these cores will saturate prior to the other on the next on-half-cycle. Such differential saturation will unbalance the bridge network 1 to produce a corresponding output across the conductors 41 and 42. This input to bridge network 2 will differentially preset the flux level in the cores 50 and 51 on its off-half-cycle, so that one of these cores will saturate prior to the other on the next on-half-cycle. This differential saturation will unbalance the bridge network 2 to produce a corresponding output across the points A and B. Further, this differential saturation will time displace the currents flowing in branch circuits 58 and 59, which include the windings 60 and 63, respectively, to effect a negative signal feedback characteristic to the two stage amplifier for the winding polarity as shown in the drawing. A reversal of the polarity of windings 60 and 63 will effect a positive signal feedback characteristic.

It is to be understood that various modifications of the invention other than those above described may be effected without departing from the principle and scope of the invention as defined in the appended claims.

What is claimed is:

1. A two-stage half-wave magnetic amplifier having an A.C. line, each stage comprising a pair of closed magnetic circuits, two reactor windings inductively disposed on each magnetic circuit, two branch circuits connected across said A.C. line, each branch circuit including in series one said reactor winding on one of the said magnetic circuits and a second said reactor winding on the other of said magnetic circuits, two unidirectional devices in each branch circuit, said devices in each of the two stages being poled in the same direction and the devices in the two stages being respectively oppositely poled, each stage also comprising a control circuit including two control windings, one control winding being disposed on each magnetic circuit, the two control windings in each stage being arranged in push-pull flux relationship with respect to the two magnetic circuits, means conductively connecting the control circuit of the second stage to the branch circuits of the first stage at points between the two unidirectional devices in each branch circuit of the said first stage, and a feedback-bias winding disposed on each magnetic circuit of the first stage, each feedback-bias winding being in one of the branch circuits of the second stage.

2. A two-stage half-wave magnetic amplifier as claimed in claim 1, wherein each said feedback-bias winding is disposed upon its magnetic circuit so as to induce a flux in opposition to the flux induced in its magnetic circuit by the said reactor windings disposed thereon.

3. A two-stage half-wave magnetic amplifier having an A.C. line, each stage comprising a pair of closed magnetic circuits, a reactor winding inductively disposed on each magnetic circuit, two impedances, two branch circuits connected across said A.C. line, each branch circuit including in series one said reactor winding and one said impedance, two unidirectional devices in each branch circuit, said devices in each of the two stages being poled in the same direction and the devices in the two stages being respectively oppositely poled, each stage also comprising a control circuit including two control windings, one control winding being disposed on each magnetic circuit, the two control windings in each stage being arranged in push-pull flux relationship with respect to the two magnetic circuits, means conductively connecting the control circuit of the second stage to the branch circuits of the first stage at points between the two unidirectional devices in each branch circuit of the said first stage, and a feedback-bias winding disposed on each magnetic circuit of the first stage, each feedback-bias winding being in one of the branch circuits of the branch circuits of the second stage.

4. A two-stage half-wave magnetic amplifier as claimed in claim 1, wherein each said feedback-bias winding is disposed upon its magnetic circuit so as to induce a flux in opposition to the flux induced in its magnetic circuit by the said reactor winding disposed thereon.

References Cited in the file of this patent

UNITED STATES PATENTS 2,730,574 Belsey ________________ Jan. 30, 1956

OTHER REFERENCES

Publication: Magnetic-Amplifier Circuits, by Wm. A. Geyger, McGraw-Hill Book Co., Inc., New York, 1954, pp. 192–194.